United States Patent [19]

Murakami

[11] Patent Number: 4,661,138

[45] Date of Patent: Apr. 28, 1987

[54] METHOD OF STRENGTHENING THE ALKALI RESISTANCE OF A POROUS GLASS

[75] Inventor: Yukio Murakami, Odawara, Japan

[73] Assignee: Fuji Photo Film Co., Ltd., Kanagawa, Japan

[21] Appl. No.: 735,287

[22] Filed: May 17, 1985

Related U.S. Application Data

[63] Continuation of Ser. No. 416,236, Sep. 9, 1982, abandoned.

[30] Foreign Application Priority Data

Sep. 17, 1981 [JP] Japan ................................ 59-145548

[51] Int. Cl.$^4$ ............................................. C03C 15/00
[52] U.S. Cl. ........................................... 65/31; 65/17; 501/12
[58] Field of Search .......................... 65/31, 17, 60.52; 501/12; 427/304

[56] References Cited

U.S. PATENT DOCUMENTS

| 2,491,761 | 12/1949 | Parker | 65/31 X |
| 2,831,780 | 4/1958 | Deyrup | 65/60.52 |
| 3,681,113 | 8/1972 | Yoldas | 501/12 |
| 3,847,583 | 11/1974 | Dislich et al. | 501/12 X |
| 4,295,868 | 10/1981 | Holter | 55/302 |
| 4,340,408 | 7/1982 | McMillan et al. | 65/31 |

FOREIGN PATENT DOCUMENTS

| 2829413 | 6/1979 | Fed. Rep. of Germany | 65/31 |
| 1041996 | 9/1966 | United Kingdom . | |

OTHER PUBLICATIONS

Yoldas; Journal of Materials Science, 12 (1977) 1203–1208, vol. No. 6; Chapman and Hall Ltd., printed in Great Britain; copy in 501–12.

*Primary Examiner*—Kenneth M. Schor
*Attorney, Agent, or Firm*—Armstrong, Nikaido, Marmelstein & Kubovcik

[57] ABSTRACT

This invention is concerned with a method of strengthening the alkali resistance of a porous glass, which comprises eluting the acid-soluble phase of a phase separation glass with an acid to form a porous glass, immersing the resulting porous glass in a solution of zirconium alcoholate to form a thin film of the zirconium salt on the surface of the porous glass, hydrolyzing, drying, calcining and thereby forming $ZrO_2$ polymer on the surface of the porous glass.

9 Claims, No Drawings

METHOD OF STRENGTHENING THE ALKALI RESISTANCE OF A POROUS GLASS

This application is a continuation of application Ser. No. 416,236 filed 9/9/82 now abandoned.

BACKGROUND OF THE INVENTION

1. Field of the Invention

This invention relates to a method of strengthening the alkali resistance of a porous glass and more particularly, it is concerned with a method of strengthening the alkali resistance of a porous glass of $SiO_2$ by applying a $ZrO_2$ coating.

2. Description of the Prior Art

A porous glass is prepared by utilizing the phase separation phenomenon of sodium borosilicate glass, i.e. by subjecting sodium borosilicate glass to a phase separation heat treatment to split into an $SiO_2$ rich phase and $B_2O_3$—$Na_2O$ rich phase, treating with an acid to remove the acid-soluble $B_2O_3$—$Na_2O$ phase and to retain the acid-insoluble $SiO_2$ phase as skeleton and thus forming a three-dimensionally connected network of $SiO_2$. Processes for the production of such a porous glass are disclosed in "Makushi" 4 (4) 221-227, "Gel Permeation Chromatography of Macroparticles" 3-18 (1980), U.S. Pat. Nos. 3,549,524 (1970) and 3,758,284 (1973).

On the other hand, as another process for producing a porous glass, there has been proposed a technique of forming an oxide polymer based on the hydrolysis reaction of metal alkoxides. For example, the use of titanium tetralkoxide $Ti(OR)_4$ is described in "Bosei Kanri" 7, 23-25 (1979), which hydrolysis steps are represented below:

$$Ti(OR)_4 + H_2O \rightarrow Ti(OR)_3OH + ROH$$

$$Ti(OR)_3OH + Ti(OR)_4 \rightarrow (RO)_3TiOTi(OR)_3 + ROH$$

This dimer is further hydrolysed and the hydrolysis proceeds substantially up to formation of titanium oxide, as follows:

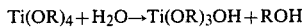
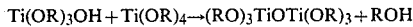
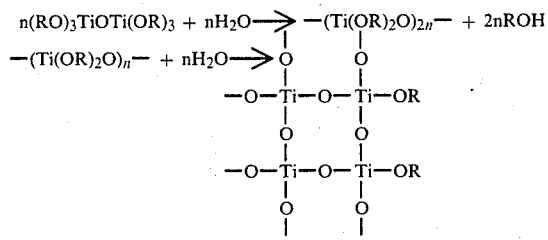

In addition, "Yogyo Kyokaishi" 85 (9), 448-454 (1977) describes a method of forming an amorphous film consisting of a composite oxide polymer of $TiO_2$—$ZrO_2$—$SiO_2$ based on the hydrolysis reaction of metal alcoholates.

However, the porous glass prepared as described above has the disadvantage that it tends to be chemically etched with an alkaline solution according to the following mechanism:

A porous glass consists of about 90% by weight or more of $SiO_2$ which intrinsically tends to be chemically etched with an alkaline solution. This $SiO_2$ forms a skeleton, i.e. matrix phase in such a small thickness, e.g. about several hundred Å that it is readily subject to etching to be water-soluble sodium silicate as follows:

$$SiO_2 + 2NaOH \rightarrow Na_2SiO_3 \cdot nH_2O + (1-n)H_2O$$

Furthermore, a porous glass has a very large specific surface area as can readily be assumed from the formation scheme of phase separation. For example, the specific surface area amounts to about 200 m²/g when the average pore size is 100 Å in diameter. Such a physical shape causes increasing of etching with an alkaline solution.

For porous glasses, it is required to handle or treat alkaline solutions and in this case, the following drawbacks are brought. When a granular porous glass is used as a column packing material for gel permeation, ion exchange or adsorption chromatography in the separation and purification of various proteins, for example, impure proteins adsorb and remain often on the packing material after the separation and purification of the object material. If the packing material is treated with a strongly alkaline solution for the purpose of desorption thereof, the packing material itself is etched and size-reduced to decrease the effective volume of the packing phase. When a granular porous glass is used as an immobilized enzyme support desorportion of the deactivated enzyme is sometimes carried out by treating with an alkaline solution after the reaction of the enzyme and substrate and in this case, the immobilized phase is also etched to give a similar phenomenon to described above.

SUMMARY OF THE INVENTION

It is an object of the present invention to provide a method of increasing the alkali resistance of a porous glass.

It is another object of the present invention to overcome the disadvantage of a porous glass that it tends to be etched with alkaline solutions.

It is a further object of the present invention to provide a process for the production of an alkali resisting porous glass from sodium borosilicate glass.

These objects can be attained by a method of strengthening the alkali resistance of a porous glass, which comprises eluting the acid-soluble phase of a phase separation glass with an acid to form a porous glass, immersing the resulting porous glass in a solution of zirconium alcoholate to form thin film of the zirconium salt on the surface of the porous glass, then hydrolysing, drying, calcining in an atmosphere, e.g. in an oxidizing atmosphere and thereby forming $ZrO_2$ polymer on the surface of the porous glass.

DETAILED DESCRIPTION OF THE INVENTION

The inventors have made efforts to overcome the disadvantages of the prior art porous glass that it tends to be attacked with alkaline solutions and consequently, have found that an excellent resistance to alkali attacking can be obtained by applying a $ZrO_2$ film formed by hydrolysis of zirconium tetraloxide to the surface of the porous glass. The present invention is based on this finding.

Accordingly, the present invention provides a process for producing a porous glass with increased resistance to alkali etching or attacking with alkaline solutions, which comprises eluting the acid-soluble phase of a phase separation glass with an acid to form a porous glass, immersing the resulting porous glass in a solution of zirconium alcoholate to form a thin film of the zirconium salt on the surface of the porous glass, then hydrolysing, drying, calcining in an oxidizing atmosphere and thus forming crystalline $ZrO_2$ and/or amorphous $ZrO_2$ polymer on the surface of the porous glass.

Useful examples of the zirconium alcoholate used in the present invention are zirconium n-propoxide, zirconium iso-propoxide, zirconium n-butoxide and the like. Above all, zirconium tetra(n-butoxide) is the most preferable. Even if there are further other metal alcoholates such as titanium alcoholate, the alkali resistance is improved substantially in proportion to the content of zirconium.

For immersing a porous glass in a solution of zirconium alcoholate, a vacuum impregnation method is employed to permeate the solution throughout the pores. There takes place dealcolation reaction between the silanol groups on the surface of the porous glass and the alkyl groups in the coating agent whereby the zirconium alkoxide is strongly combined with the glass surface through covalent bond. Thereafter, hydrolysis of the zirconium salt is carried out by allowing to stand in an atmosphere at a temperature of about 70° to 100° C. and a relative humidity of about 80 to 100% for several hours.

Calcination is then carried out at a temperature of 450° to 650° C. for several hours for the purpose of removing unreacted excessive alkyl groups and solvents and crystallizing the $ZrO_2$ layer formed through the hydrolysis reaction. If the calcination temperature is lower than 450° C., removal of organic materials is not sufficient and crystallization of the $ZrO_2$ layer is not promoted, while if higher than 650° C., the pores of a porous glass being to shrink thus deteriorating the pore property. Moreover, in order to prevent the carburized products of the organic materials from remaining in the pores, it is preferable to effect the calcination in an oxidizing atmosphere, in particular, in oxygen gas stream.

The thus resulting porous glass has a $ZrO_2$-modified surface such that in the case of a powdered from, granules do not adhere to each other, carburized products due to incomplete combustion of organic materials are not retained and the resistance to chemical etching with alkaline solutions is very excellent. This alkali resistance porous glass can be used as an immobilized enzyme support or a packing material for separation and purification without volume reduction of the packed phase due to alkali attacking leading to deterioration of the reaction efficiency and without change of the pore property due to alkali attacking, i.e. enlargement of the average pore diameter, increase of the dispersion of the pore diameter distribution, etc. In addition, the packing material of this process glass can be prevented from reduction of the grain diameter due to alkali attacking, so that the instability or difficulty of column operation due to clogging of the column and change of the flow rate may be avoided.

The embodiment of the present invention will now be illustrated. Raw materials of a specific composition of $SiO_2$—$B_2O_3$—$Na_2O$ ternary system are mixed, melted and stirred to obtain a homogeneous glass block. After cooling rapidly, this glass block is subjected to a phase separation heat treatment at 500° to 700° C. in an electric furnace which temperature is precisely controlled, whereby to form two phases, i.e. $SiO_2$ phase and $B_2O_3$—$Na_2O$ phase. The $B_2O_3$ phase being acid-soluble is eluted and removed by an acid treatment to retain the acid-insoluble $SiO_2$ as skelton, thus obtaining a porous glass having a continuous network structure that fine pores penetrate over all. This porous glass is then immersed in a solution of zirconium tetralkoxide ($Zr(OR)_4$), impregnated in vacuum and subjected to removal of the excessive solution and to hydrolysis in an atmosphere with a high humidity. After the hydrolysis, the porous glass is calcined at 400° to 650° C. in an oxidizing atmosphere to remove unreacted alkyl groups and released alkyl groups. Surprisingly, the $ZrO_2$ layer formed on the surface of the porous glass during the same time is a crystalline layer according to X-ray diffraction analysis, and consequently, the resistance to attacking with alkaline solutions is remarkablly increased while holding unchanged the important properties of a porous glass free from $ZrO_2$ coating, i.e. average pore diameter, specific pore volume and pore diameter distribution. It is assumed that tha $ZrO_2$ layer is a very thin crystalline layer and covers two-dimensionally the glass surface.

The present invention will be explained in detail with reference to the following examples. It will be obvious to those skill in the art that various changes and modifications can be made in the components, ratios, operational order and the like without departing from the spirit of the present invention. Therefore, the present invention should not be construed as being limited to the following examples.

EXAMPLES

A glass of $SiO_2$—$B_2O_3$—$Na_2O$ was melted in a platinum crucible, cooled rapidly, ground roughly and subjected to a heat treatment for phase separation at 555° C. for 9 hours. Then, the glass was ground and classified to obtain a powdered sample with a grain diameter of 20 to 50 meshes. The resulting powdered sample was treated with 3N-HCL at 90° C. for 6 hours to elute the soluble phase of $B_2O_3$—$Na_2O$ and treated with $\frac{1}{2}$N—NaOH for 1 hour to remove colloidal silica in the pores, followed by washing adequately and drying, thus obtaining a powdered porous glass with a mean pore diameter of 207 Å, specific pore volume of 0.67 ml/g and pore diameter distribution of $+34/-44\%$.

The porous glass sample was then immersed at room temperature in zirconium tetra (n-butoxide) diluted with an acetic acid type solvent to 5 times. The sample was impregnated under a reduced pressure of about $10^{-2}$ Torr for 5 minutes and allowed to stand at room temperature under atmospheric pressure for one night. After separation from the treating agent, the porous glass powder was hydrolyzed in an atmosphere at 70° C. and at a relative humidity of about 80% for 6 hours, dried at 120° C. for 1 hour and calcined at 550° C. for 3 hours in an oxygen gas stream at a rate of about 1 l/min.

The properties of the above described surface treated porous glass, a non-treated porous glass and porous glasses surface-treated with other materials than zirconium alcoholates.

| Sample No. | Coating Agent | Mean Pore Diameter (Å) | Specific Pore Volume (ml/g) | Pore Dia. Distribution (± %) | Alkali Resistance* (reduced %) | OH Group (μMol/g) |
| --- | --- | --- | --- | --- | --- | --- |
| 1 | non-treated | 207 | 0.67 | +34/−44 | 28.4 | 40.7 |
| 2 | ziconiumtetra (n-butoxide) | 201 | 0.62 | +13/−51 | 7.3 | 53.2 |
| 3 | titanium tetra (n-butoxide) | 192 | 0.59 | +44/−52 | 19.4 | 51.2 |
| 4 | $ZrOCl_2.8H_2O$ (40 wt % aq.) | 216 | 0.39 | +46/−69 | 27.0 | 51.1 |

Note:
Sample 2 Example of Present Invention
Sample 1, Sample 3 and 4 Comparison Examples
*Alkali Resistance means the reduced % of Sample when treated with NaOH solution (1.0% aq.) at 50° C. for 1 hour. The reproducibility is about 5% at 36.

From these results, the following effects will be seen:

(1) When using zirconium tetra(n-butoxide) as the coating agent, the alkali resistance is the most excellent as evident from the fact that the reduced % is only ¼ of the non-treated sample. The Ti-compound is next affective and $ZrOCl_2.8H_2O$ has little effect.

(2) In comparison of the pore properties, there is little difference between the Zr-compound-treated sample and non-treated sample and the specific pore volume is decreased in the Ti-compound-treated sample and $ZrOCl_2.8H_2O$-treated sample.

(3) The OH groups on the surface of the porous glass are increased by about 20% in the Zr-compound-,Ti-compound- and $ZrOCl_2.8H_2O$-treated samples. This will serve to increase the reaction efficiency when the surface is modified with silane coupling agents or organic functional groups such as glutaraldehyde.

What is claimed is:

1. A method of strengthening the alkali resistance of a porous glass, which comprises providing a silica glass which has been phase separated eluting an acid-soluble phase of the phase separated glass by contacting the phase separated glass with an acid to form a porous glass, immersing the resulting porous glass in a solution of zirconium alcoholate to form a thin film of the zirconium alcoholate on the outer surface and pore surface of the porous glass, removing the porous glass from the zirconium alcoholate solution hydrolysing the zirconium alcoholate on the outer surface and pore surface of the porous glass to form $ZrO_2$, drying the outer surface and pore surface of the porous glass and, calcining the outer surface and pore surface of the porous glass at a temperature in the range of about 450° C. to 650° C. and thereby forming $ZrO_2$ polymer on the outer surface and pore surface of the porous glass.

2. The method of strengthening the alkali resistance of a porous glass as set forth in claim 1, wherein the glass which has been phase separated is sodium borosilicate glass.

3. The method of strengthening the alkali resistance of a porous glass as set forth in claim 1, wherein the porous glass consists of at least 90% by weight of $SiO_2$.

4. The method of strengthening the alkali resistance of a porous glass as set forth in claim 1, wherein the zirconium alcoholate is at least one member selected from the group consisting of zirconium n-propoxide, zirconium iso-propoxide and zirconium n-butoxide.

5. The method of strengthening the alkali resistance of a porous glass as set forth in claim 1, wherein the porous glass is impregnated with the zirconium alcoholate in vacuum.

6. The method of strengthening the alkali resistance of a porous glass as set forth in claim 1, wherein the hydrolysing is carried out at a temperature of 70° to 100° C. at relative humidity of 80 to 100%.

7. The method of strengthening the alkali resistance of a porous glass as set forth in claim 1, wherein the calcining is carried out in an oxidizing atmosphere.

8. The method of strengthening the alkali resistance of a porous glass as set forth in claim 7, wherein the oxidizing atmosphere is an oxygen gas stream.

9. The method of strengthening the alkali resistance of a porous glass as set forth in claim 2, wherein the sodium borosilicate has been subjected to a phase separation heat treatment at 500° to 700° C. in order to phase separate it.

* * * * *

UNITED STATES PATENT AND TRADEMARK OFFICE
CERTIFICATE OF CORRECTION

PATENT NO. :     4,661,138
DATED      :     April 28, 1987
INVENTOR(S) :    YUKIO MURAKAMI It is certified that error appears in the above-identified patent and that said Letters Patent is hereby corrected as shown below:

On the cover page, Item [30], change "59-145548" to

--- 56-145548 ---.

Signed and Sealed this

Eighteenth Day of August, 1987

*Attest:*

DONALD J. QUIGG

*Attesting Officer*     Commissioner of Patents and Trademarks